Patented Jan. 6, 1948

2,434,054

UNITED STATES PATENT OFFICE 2,434,054

MODIFIED POLYMERS OF OPEN CHAIN MONOETHYLENICALLY UNSATURATED COMPOUNDS HAVING A TERMINAL METHYLENE GROUP

Milton John Roedel, Wilmington, Del., assignor to E. I. du Pont de Nemours & Company, Wilmington, Del., a corporation of Delaware No Drawing. Application March 20, 1943, Serial No. 479,879

1 Claim. (Cl. 260—87)

This invention relates to modified polymers and their preparation and, more particularly, to a method of improving the properties, especially the plastic flow characteristics, of polymers and copolymers of readily polymerizable, open chain monoethylenically unsaturated compounds having a terminal methylene group.

Many industrially important polymers and copolymers of readily polymerizable open chain monoethylenically unsaturated compounds having terminal methylene groups are known and a variety of methods for their production are disclosed in the prior art. A number of these products, while very valuable, have not attained their maximum potential usefulness because of inferior plastic flow characteristics, which may be evidenced by poor hot working properties among the higher softening, more rigid polymers, and poor pliability and extensibility among the lower softening products. Only minor improvements in these properties are possible by careful adjustment of polymerization conditions.

An object of the present invention is to provide a practical means of imparting to the aforementioned polymers improvements in their properties of far greater significance than any effected by merely altering the polymerization conditions. A more specific object is to provide a means for effecting a substantial improvement in the plastic flow characteristics of these polymers. Other objects will be apparent from the description of the invention given hereinafter.

The above objects are accomplished according to the present invention by polymerizing a readily polymerizable, open chain monoethylenically unsaturated compound having a terminal methylene group in the presence of an aliphatic thiol or a compound obtained by oxidizing an aliphatic thiol to any stage below the maximum normal valence state of sulfur.

In practicing the invention any of the known polymerization methods may be used for conducting the polymerization of the monomeric compounds. In general, the aliphatic thiol compound is added to the monomeric compounds prior to polymerization, the proportion added being relatively small and, usually, within the range of 0.01%–5.0% by weight of the monomeric compounds, the amount being varied widely within this range depending on the monomer used and the properties it is desired that the product shall possess. Thereafter the polymerization and isolation steps are carried out in known manner.

The following examples, wherein parts are by weight unless otherwise stated, illustrate specific embodiments of the invention:

Example 1

The following dispersing solution is prepared:

1360 parts of water
29 parts of a commercial dispersing agent containing about 98% active ingredient which consists mainly of the sodium salt of isopropylated naphthalene sulfonic acid
1.2 parts of ammonium perdisulfate
0.4 part of sodium bisulfite
10 parts of sodium dihydrogen phosphate The pH of the solution is adjusted to 4.6 and the solution is then placed in a suitable reaction vessel. After the introduction of 350 parts of vinyl acetate, 50 parts of acrylonitrile, and 0.75 part of octyl mercaptan, the free space of the vessel is flushed with nitrogen and the vessel sealed. It is then heated at 36° C. to 40° C. with continuous stirring. Samples of the polymer dispersion are removed at various intervals for specific gravity determinations. Further quantities of ammonium persulfate, sodium bisulfite, and octyl mercaptan are added at the following specific gravities, all of which are determined at 25° C.:

| Sp. Gr. 25° C. | Acrylonitrile, Parts | Ammonium Perdisulfate, Parts | Sodium Bisulfite, Parts | Octyl Mercaptan, Parts |
|---|---|---|---|---|
| 0.998 | 44 | | | |
| 1.006 | 44 | | | |
| 1.014 | 44 | 1.2 | 0.4 | 0.38 |
| 1.025 | 44 | | | |
| 1.033 | 44 | | | |
| 1.043 | 44 | 1.2 | 0.4 | 0.38 |
| 1.050 | 36 | | | |

The entire polymerization requires five hours. The resulting dispersion is diluted with an equal volume of distilled water and the polymer precipitated by the addition with vigorous stirring of 10 parts of 10% aluminum sulfate solution. The resulting slurry is heated with vigorous agitation to a temperature of approximately 85° C.

after which a large volume of cool water is added. The polymer is now in the form of dense particles and is easily filtered and washed with a large volume of water until all traces of electrolyte and dispersing agent are removed. The yield amounts to 558 parts. The dried polymer is sheeted in a molding press and the resulting sheets chopped up to pass a ⅜" screen.

The product thus obtained is molded in an injection molding machine, suitably a one ounce capacity injection molding machine, which is supplied with a die capable of molding test specimens. Die closing and injection take place during a period of 1.25 seconds. The machine is timed to maintain piston pressure on the molding powder and die clamping pressure for fifteen seconds, and a new injection is made every sixty seconds. The polymer may be molded under several temperature conditions to yield specimens of good clarity and light color. With the heating cylinder delivering polymer at 235° C., satisfactory moldings are produced under 14,000 lbs./sq. in. piston pressure, and even more satisfactory moldings are produced at 200° C. under 20,000 lbs./sq. in. piston pressure. The 5" x ½" x ⅛" bars produced in this manner can be bent double sharply without breaking.

A copolymer prepared by a similar method without the addition of octyl mercaptan as a modifier shows very unsatisfactory injection molding behavior. Thus it is impossible to obtain full bars at temperatures below 225° C. and even at this temperature the surface appearance of the bars is very poor. Higher temperatures give full bars having even poorer surfaces.

Example 2

| | Parts |
|---|---|
| (a) Distilled water | 4800 |
| $Na_2HPO_4.H_2O$ | 56 |
| 1% aqueous solution of 65% sodium salt of polymethacrylic acid | 480 |
| (b) Methyl methacrylate monomer | 2793 |
| Dodecyl mercaptan | 7 |
| Octadecyl alcohol (lubricant) | 28 |
| (c) Benzoyl peroxide | 7 |

The ingredients in (a) are dissolved together and charged into a glass enamel-lined reaction kettle capable of withstanding pressures up to 300 lbs./sq. in. and fitted with a stainless steel anchor-shaped stirrer, stainless steel baffles, thermocouple for observing the internal temperature, and a pressure gauge. The catalyst (c) is freshly dissolved in solution (b) and charged at once into the reaction kettle. The kettle is closed and the stirrer is operated at 575 R. P. M. throughout the run. External heat is applied to bring the kettle content to a temperature above 110° C. within fifteen to twenty minutes, at which time the pressure gauge shows about 45 lbs./sq. in. pressure. The heat is then shut off, and within one to two minutes the exothermic polymerization begins and there is a surge of temperature and pressure to 128° C. and 68 lbs./sq. in. where the bulk of the polymerization takes place. Within about five minutes there is a rapid drop in pressure to about 15 lbs./sq. in. and the temperature likewise begins to fall. Stirring is continued until the kettle contents have cooled to 40° C. or below at which time the pressure gauge shows zero pressure. The kettle is discharged and the product removed from the motor liquor on a filter cloth and washed repeatedly with distilled water until the washings are clear. This requires a total of about 20,000 parts of water. Excess water is removed by means of a centrifuge and the product is dried at 100° C. for twenty-four hours under vacuum.

The fine granular product is converted to molding powder suitable for injection molding by hot pressing into sheets at 160° C. followed by chopping into lumps which will pass a ⅜" screen. This powder is then molded in an injection molding machine according to the technique described in Example 1. The polymer may be molded under several temperature conditions to yield specimens of attractive appearance. When the heating cylinder delivers polymer at 220° C. into the cold die, satisfactory moldings are produced under 24,500 lbs./sq. in. piston pressure. At 230° C. the pressure required is 21,000 lbs./sq. in. and at 240° C. 16,000 lbs./sq. in. Under all these conditions moldings of excellent clarity and surface characteristics are obtained which are faithful reproductions of the die cavity. Injection molded strips from a 2½" x ½" x 0.065" die molded at 230° C. are found to soften at 90° C. A similar strip of the above polymer prepared by compression molding at 160° C. under 5000 lbs./sq. in. pressure likewise softens at 90° C. However, a methyl methacrylate polymer polymerized as above without the addition of dodecyl mercaptan as a modifier and converted to molding powder in the same manner, yields injection molding test strips which soften at 67° C., whereas compression molded strips of the same polymer soften at 90° C.

Example 3

The following dispersing solution is prepared:

| | Parts |
|---|---|
| Water | 1120 |
| Sodium salt of sulfonated paraffin oil | 54 |
| Ammonium perdisulfate | 7.32 |
| $KH_2PO_4$ | 6.0 |

The solution is adjusted to a pH of 7 with potassium hydroxide solution. Ninety-nine parts of this solution together with 50 parts of vinyl acetate and 2.5 parts of dodecyl mercaptan is placed in a container, the free space of which is swept out with nitrogen and thereafter agitated at 45° C. for forty hours. At the end of this time the polymer is coagulated by the addition of concentrated sodium chloride solution, and steam distilled to remove residual monomer. The polymer is washed on a corrugated roll mill with warm water and dried on smooth rolls at 80° C. The yield amounts to 50 parts.

The product thus obtained is much more pliable and elastic than unmodified polyvinyl acetate prepared under similar conditions. For example, it can be stretched readily to 300% elongation with a fairly rapid return to the original length on release of tension. Moreover, when 25 parts of the product are milled with 3 parts of di(butoxyethyl) phthalate, the resulting product is much softer than unmodified polyvinyl acetate plasticized in the same manner. Actually, unmodified polyvinyl acetate plasticized with di(butoxyethyl) phthalate is somewhat less elastic than dodecyl mercaptan-modified polyvinyl acetate containing no added plasticizer. Paper and cloth which are impregnated with the dispersion of dodecyl mercaptan-modified polyvinyl acetate before coagulation, show very great improvement in tear resistance. Similarly, the dispersions are excellent finishes for leather, whereas a dispersion of unmodified polyvinyl acetate is not completely satisfactory for this application.

Example 4

The following mixture is polymerized under a nitrogen atmosphere by agitating in a closed vessel at 45° C. for fifteen hours:

| | Parts |
|---|---|
| Methyl acrylate | 50 |
| Octyl mercaptan | 2.5 |
| Distilled water | 100 |
| Ammonium perdisulfate | 0.5 |
| Sodium salt of sulfonated paraffin oil | 10 |

At the conclusion of this period the polymer is isolated by the addition of aluminum sulfate solution, followed by steam distillation to remove residual monomer, and washing with water to remove occluded dispersing agent and electrolyte. About 40 parts of a very viscous syrup are obtained as the product. This syrup is dissolved in acetone and the solution applied to cellulose film. The resulting coated cellulose adheres well to metal, glass and wood, and can be pulled away from these surfaces without stripping the film material from the cellulosic substrate.

Example 5

The following dispersing solution is prepared:

| | Parts |
|---|---|
| Sodium salt of sulfonated paraffin oil (32% active ingredient) | 62.5 |
| Ammonium perdisulfate | 2.5 |
| Sodium bisulfite | 1.0 |
| Water | 934 |

The pH of this solution is adjusted to 2.4 by the addition of dilute hydrochloric acid. Mixtures of 68 parts of vinyl chloride, 12 parts of methyl acrylate and the amounts of octyl mercaptan recorded below are polymerized under nitrogen in a closed vessel in the presence of 160 parts of this dispersing solution, at 40° C. for twenty-three hours. The following table summarizes the properties of the polymers:

| Octyl Mercaptan, per cent | Viscosity Poises, 10% Soln. in Cyclohexanone at 25° C. | Properties of Sheets | Softening Temp., ° C. | Bell Flow 150° C. (ASTM 1940 preprint #108) |
|---|---|---|---|---|
| None | 3.3 | Tough | 65 | 19.5 |
| 0.1 | 2.1 | ...do | 65 | 21.7 |
| 0.2 | 2.0 | ...do | 66 | 24.5 |
| 0.3 | 1.4 | ...do | 65 | Overflow |
| 0.4 | 0.9 | ...do | 64 | Do. |

Thus it is apparent that the addition of octyl mercaptan results in a striking improvement in plastic flow as measured by the Bell flow determination.

Example 6

The following dispersing solution is prepared:

| | Parts |
|---|---|
| Sodium salt of sulfonated paraffin oil (32% active ingredient) | 112 |
| Ammonium perdisulfate | 4.5 |
| Sodium bisulfite | 0.65 |
| Distilled water | 1683 |

The pH of this solution is adjusted to 2.5 by the addition of an appropriate amount of formic acid. Two parallel experiments are carried out in which a mixture of 72 parts of vinyl chloride and 8 parts of dimethyl fumarate is polymerized in the presence of 160 parts of the above dispersing solution. In the one case 0.24 part of octyl mercaptan is added to the monomer mixture prior to polymerization while in the second case no addition is made. Polymerization is carried out at 40° C. for twenty hours, after which the polymer is isolated as in Example 1. In each case the yield of polymer is quantitative. The following table records data on the physical properties of the two polymers:

| Per cent Octyl Mercaptan | Bell flow (150° C.) | Impact strength, Ft. lbs./in. of notch |
|---|---|---|
| 0 | 17.85 | 0.63 |
| 0.3 | 30.14 | 0.61 |

Thus, it can be seen that the plastic flow as expressed by the Bell flow values is greatly increased by the addition to the monomer mixture of 0.3% octyl mercaptan, and that this addition does not seriously impair the strength of the polymer.

Example 7

A dispersing solution similar to that in Example 6 is prepared and a mixture of 72 parts of vinyl chloride, 8 parts of vinylidene chloride and 0.24 part of octyl mercaptan, together with 160 parts of the dispersing agent is agitated under nitrogen in a closed vessel at 40° C. for twenty hours. Thereafter the pressure is released and the polymer is isolated as in Example 1. The yield amounts to 74 parts and the polymer shows good plastic flow as judged by the Bell flow determination, and likewise excellent strength and toughness.

Example 8

A dispersing solution having the following composition is prepared:

| | Parts |
|---|---|
| Aqueous solution containing 65% of the sodium salt of acetyl octadecane sulfuric ester | 6.2 |
| Ammonium perdisulfate | 0.5 |
| Sodium bisulfite | 0.1 |
| Water | 193 |

The pH is adjusted to 7.2, and a mixture of 100 parts of this solution, 50 parts of butyl methacrylate, and 1.5 parts of dodecyl mercaptan is agitated under nitrogen in a closed vessel at 35° C. for a total of twenty-three hours. The resulting dispersion is very mobile and deposits clear, tack-free, highly extensible films on surfaces such as glass, wood and leather. Polybutyl methacrylate dispersions prepared in the absence of dodecyl mercaptan show greater tack and considerably poorer flexibility and extensibility.

Example 9

A dispersing solution having the following composition is prepared:

| | Parts |
|---|---|
| Solution containing about 32% of the sodium salt of sulfonated paraffin oil | 100 |
| Ammonium perdisulfate | 4 |
| Sodium bisulfite | 0.5 |
| Water | 1495 |

The pH of this solution is adjusted to 2.5 by the appropriate addition of formic acid. This solution is then used as the aqueous vehicle for the emulsion polymerization of the following monomer mixtures, an aqueous/non-aqueous ratio of 2:1 being employed and polymerization being carried out in a closed vessel under nitrogen at 35° C.: vinylidene chloride/ acrylonitrile 90%/10% plus 0.5% hexadecyl mercaptan, vinylidene chloride/vinyl acetate 90%/10% plus 0.5% hexadecyl mercaptan, and vinylidene chloride/butyl methacrylate 90%/10% plus 0.5% hexadecyl mercaptan. Polymerization is substantially complete after twenty hours and the resulting dispersions are thin, mobile liquids which deposit continuous, tough, flexible, elastic films when laid down upon glass, leather, wood or the like. The films show greater resilience and coherence as well as better clarity than similar films prepared from dispersions produced in the absence of hexadecyl mercaptan.

*Example 10*

The following dispersing solution is prepared:

| | Parts |
|---|---|
| Solution containing about 32% of the sodium salt of sulfonated paraffin oil | 62.5 |
| Ammonium perdisulfate | 2.5 |
| Distilled water | 935 |

The pH of this solution is adjusted to 2.5 with formic acid and it is then charged into a polymerization vessel with a mixture of 350 parts of vinylidene chloride, 150 parts of acrylonitrile and 1.5 parts of dodecyl mercaptan. The polymerization vessel is flushed out with nitrogen, closed and agitated at 35° C. for a total of ninety-six hours. The polymerization vessel is then discharged and the polymer isolated as in Example 1, yielding a total of 450 parts. A Bell flow determination carried out with this polymer gives a value of 40 at 150° C. as compared with 18.5 for a similar polymer prepared in the absence of dodecyl mercaptan.

*Example 11*

A solution consisting of 1,000 parts of water, 1 part of ammonium persulfate, and 0.3 part of sodium bisulfite is placed in a glass vessel equipped with stirrer, reflux condenser, and nitrogen inlet. The reaction vessel is immersed in a bath which is maintained at 35° C. A mixture of 100 parts of acrylonitrile and 0.5 part of beta-hydroxyethane thiol is added, the stirrer started, and a current of nitrogen passed over the mixture. After six hours, the polymer is filtered and washed with water and methanol and dried. A yield of 66.7 parts of dried product is obtained. This polymer dissolves in dimethyl-formamide from which strong fibers of the polymeric material may be obtained by "dry-spinning."

The above examples are merely illustrative and the invention broadly comprises polymerization of the herein mentioned monomeric compounds, either singly or in admixture of two or more, in the presence of an aliphatic thiol or a compound obtainable by oxidizing such thiols to any stage below the maximum normal valence state of sulfur.

This invention is applicable to any readily polymerizable, open chain monoethylenically unsaturated compound having a terminal methylene group, or to mixtures of two or more of such compounds. For the purposes of this application the polymerizable compounds included are those which undergo polymerization to the extent of at least 50% of the original monomer weight when heated at 80° C. for twenty-four hours under autogenous pressure in the presence of 1% benzoyl peroxide. Among such compounds, all of which fall under the class of vinyl or vinylidene compounds, there may be mentioned the following as particularly suitable for use in this invention: acrylic, chloracrylic and methacrylic acids, and their esters, e. g., methyl methacrylate, ethyl methacrylate, butyl methacrylate, octyl methacrylate, 2-nitro-2-methyl propyl methacrylate, methoxymethyl methacrylate, chloroethyl methacrylate, and the corresponding esters of acrylic and alpha-chloracrylic acids; vinyl and vinylidene halides, e. g., vinyl chloride, vinyl fluoride, vinyl bromide, vinylidene chloride, 1-chloro-1-bromoethylene, vinylidene bromide, 1-fluoro-1-chloroethylene; vinyl and vinylidene nitriles such as, acrylonitrile, methacrylonitrile, and alpha-chloroacrylonitrile; acrylamide, methacrylamide, alpha-chloroacrylamide or mono-alkyl substitution products thereof; methyl vinyl ketone and methyl isopropenyl ketone; vinyl carboxylates such as vinyl acetate, vinyl chloroacetate, vinyl propionate, vinyl stearate; N-vinyl imides such as N-vinyl phthalimide, N-vinyl succinimide, and N-vinyl tetrahydrophthalimide; methylene malonic esters, itaconic acid and itaconic esters, and the like. Of the above vinyl and vinylidene compounds, the vinyl and vinylidene halides, the vinyl carboxylates, and the acrylic derivatives are especially preferred.

The invention is also applicable to the copolymerization of these compounds with not more than equal proportions by weight of other monoethylenically unsaturated copolymerizable substances such as ethylene, propylene, isobutylene, or alkyl vinyl ethers, ethylene-alpha, beta-dicarboxylic acids, or their anhydrides or derivatives such as diethyl fumarate, diethyl maleate, diethyl citraconate, diethyl mesaconate, and N-alkyl maleimides; crotonic esters, and the like.

This invention is applicable to all the recognized polymerization processes. Thus, the methods of polymerization may include (1) emulsion, (2) granulation, (3) solution, which includes systems in which both monomer and polymer are soluble and those in which only the monomer is soluble and the polymer precipitates as it is formed, and (4) bulk. All of these processes are thoroughly discussed in the prior art and are familiar to skilled workers. It is to be understood that the present invention is applicable to such processes whether they are conducted batchwise or in a continuous manner. Operating conditions will be established by the monomer or monomers being polymerized. Thus, with halogenated compounds such as vinyl chloride or vinylidene chloride polymerization is usually conducted in aqueous emulsion at temperatures below 50° C. using ammonium or alkali perdisulfates as catalysts. On the other hand, the lower alkyl esters of methacrylic acids are usually polymerized by bulk or granulation processes at temperatures above 50° C. using benzoyl peroxide catalyst. For other monomers or monomer combinations other catalysts such as acetyl benzoyl peroxide, lauroyl peroxide, succinyl peroxide, dibutyryl peroxide, urea peroxide, diethyl peroxide, and hydrogen peroxide may be employed. Additional oxygen yielding inorganic water-soluble catalysts which may be used in aqueous systems include perborates, perphosphates, peracetates, and the like. In addition, for certain monomeric materials sulfur dioxide alone is a suitable catalyst. In cases in which polymerization is carried out under the influence of light, accelerators may be added. In polymerizations carried out in aqueous systems polymerization adjuvants selected from the class of oxidizable oxygen-containing sulfur compounds may be employed to assist in accelerating the polymerization.

Among the aliphatic thiols of which alkane thiols and hydroxy-alkane thiols are preferred, and their low valence oxidative conversion products which may be employed as polymerization modifiers in the present invention are: ethyl mercaptan, amyl mercaptan, octyl mercaptan, dodecyl mercaptan, hexadecyl mercaptan, octadecyl mercaptan, pentadecanethiol-8, ethanedithiol, trimethylene dithiol, decanedithiol-1,10, didodecyl disulfide, thioglycolic acid, thioacetic acid, mercaptoethanol, diisopropyl xanthogen disulfide, penta-acetyl 1-thiosorbitol, methyl-2-methyl-3-mercaptopropionate, tetraethyl thiuram disulfide, and the like. Other similar sulfur-containing compounds which may be used in accordance with the present invention include the following: pinanethiol, dibenzoyl disulfide, mercaptobenzothiazole, and p-toluene-sulfinic acid.

The concentration of modifier required to bring about a desired improvement in polymer plasticity depends both on the monomer or monomers being polymerized and the modifier employed. For example, vinyl acetate polymerizes readily in the presence of 5% dodecyl mercaptan to give a product having desirable properties. For the vinyl chloride/diethyl fumarate combination, 0.2–0.4% dodecyl mercaptan produces the most significant improvements in plasticity without impairment of the other properties of the polymer.

In general, for a given polymer or copolymer the effect of thiols or disulfides on plasticity is roughly proportional to the mol per cent of sulfur contained in the modifier. This generalization holds particularly with the shorter chain aliphatic monothiols. With increasing chain length of the modifier there is an increasing deviation from this rule, and the effect of the modifier becomes less marked. Changes in the substituents attached to the thiol or disulfide group may exert a pronounced influence. All of these factors make it impossible to predict in advance the exact type and amount of modifier required to produce the desired effect for a given polymer system, and makes necessary a certain amount of empirical experimental work to establish proper conditions.

In general, the uses for the various modified products of this invention are similar to those for which the corresponding unmodified polymers may be employed. However, the modified products because of their greater plasticity may frequently be substituted for products which normally contain relatively high concentrations of plasticizers. The elimination of plasticizers is frequently very beneficial since the products are initially higher softening and more resistant to heat and are less subject to change by gradual loss of plasticizer. The modified products are especially desirable for applications which require that they be extruded or injection molded.

As many apparently widely different embodiments of this invention may be made without departing from the spirit and scope thereof, it is to be understood that the invention is not limited to the specific embodiments thereof except as defined in the appended claim.

I claim:

A process which comprises polymerizing a mass, the polymerizable portion of which consists solely of vinyl acetate, in the presence of a peroxy catalyst and approximately 2% by weight of said vinyl acetate of lauryl mercaptan.

MILTON JOHN ROEDEL.

REFERENCES CITED

The following references are of record in the file of this patent:

UNITED STATES PATENTS

| Number | Name | Date |
| --- | --- | --- |
| 2,281,613 | Wollthan | May 5, 1942 |
| 2,321,693 | Meisenburg | June 15, 1943 |
| 2,108,044 | Crawford | Feb. 15, 1938 |
| 2,296,399 | Otto | Sept. 22, 1942 |
| 2,344,918 | Johnson | Mar. 21, 1944 |
| 2,380,475 | Stewart | July 31, 1945 |
| 2,380,905 | Stewart | July 31, 1945 |
| 2,396,997 | Fryling | Mar. 19, 1946 |

FOREIGN PATENTS

| Number | Country | Date |
| --- | --- | --- |
| 464,951 | Great Britain | Apr. 28, 1937 |
| 814,852 | France | Mar. 30, 1937 |
| 840,592 | France | Jan. 16, 1939 |